(12) United States Patent
Berstis et al.

(10) Patent No.: US 7,809,647 B2
(45) Date of Patent: Oct. 5, 2010

(54) PROCESSING SYSTEM FOR RECORDING MEDIA CONTENT

(75) Inventors: Viktors Berstis, Austin, TX (US); Fabian F. Morgan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1708 days.

(21) Appl. No.: 11/044,448

(22) Filed: Jan. 27, 2005

(65) Prior Publication Data

US 2006/0167806 A1 Jul. 27, 2006

(51) Int. Cl.
*H04L 9/00* (2006.01)
*H04H 20/74* (2008.01)
*H04H 20/71* (2008.01)

(52) U.S. Cl. .............. 705/52; 705/51; 705/53; 455/3.01; 455/3.02; 455/3.03; 455/3.04

(58) Field of Classification Search ............ 725/31
See application file for complete search history.

(56) References Cited

U.S. PATENT DOCUMENTS

| | | | | |
|---|---|---|---|---|
| 5,959,945 A * | 9/1999 | Kleiman | ...................... | 381/81 |
| 6,112,064 A | 8/2000 | Arrowsmith et al. | ..... | 455/186.1 |
| 6,209,787 B1 * | 4/2001 | Iida | ........................... | 235/381 |
| 6,246,672 B1 | 6/2001 | Lumelsky | .................. | 370/310 |
| 6,647,417 B1 * | 11/2003 | Hunter et al. | ............... | 709/225 |
| 6,876,901 B2 * | 4/2005 | DiLorenzo | .................. | 700/231 |
| 6,904,264 B1 * | 6/2005 | Frantz | ....................... | 455/3.04 |
| 6,947,705 B2 * | 9/2005 | Tsuchiuchi | ............... | 455/3.06 |
| 6,974,076 B1 * | 12/2005 | Siegel | ........................ | 235/380 |
| 2001/0042109 A1 | 11/2001 | Bolas et al. | ................. | 709/219 |
| 2002/0046084 A1 * | 4/2002 | Steele et al. | .................. | 705/14 |
| 2002/0048224 A1 | 4/2002 | Dygert et al. | .................. | 369/1 |
| 2003/0233282 A1 | 12/2003 | Ward et al. | .................... | 705/26 |
| 2005/0138654 A1 * | 6/2005 | Minne | ......................... | 725/31 |
| 2006/0085521 A1 * | 4/2006 | Sztybel | ...................... | 709/219 |

* cited by examiner

*Primary Examiner*—Andrew J. Fischer
*Assistant Examiner*—C. Aaron McIntyre
(74) *Attorney, Agent, or Firm*—David A. Mins, Jr.; William Steinberg; Robert V. Wilder

(57) ABSTRACT

A method and system are provided in which a user is enabled to record, for example, a song or other radio and/or video content, on demand, and to account for and process appropriate payment for the use of the recorded content. The recorded material is saved and indexed by title and is retrievable for subsequent review, tabulation and/or playing at the user's convenience. In one example, a user is enabled to record received media content by pressing a single "ADD" button at any time while a favorite song is being received and played. The song then being played together with the title of the song or video presentation are then saved to memory for subsequent retrieval and playing. The received content is accounted for and tabulated and a payment for the use of the recorded song is processed by the user in accordance with a predetermined payment schedule.

1 Claim, 8 Drawing Sheets

PROCESSING SYSTEM FOR RECORDING MEDIA CONTENT

RELATED APPLICATIONS

Subject matter disclosed and not claimed herein is disclosed and claimed in related co-pending application Ser. Nos. 11/044,590 and 11/044,569 which are assigned to the assignee of the present application and included herein by reference.

FIELD OF THE INVENTION

The present invention relates generally to information processing systems and more particularly to a system and methodology for processing payments for received digital signals.

BACKGROUND OF THE INVENTION

In the rapidly changing world of telecommunications and electronics in general, the concepts of radio that exist today are not much different from those in existence in the early part of the twentieth century. Despite the advent of physical media which enable a user to carry the music to which the user wishes to listen, the concept of radio still exists in a format offering users very few user options. Although a user may choose a station or several stations which may be preferred by the user, there are no current options which enable users to listen to preferred music selections, for example, at the user's convenience rather than on the timetables provided by the local broadcasters.

Moreover, it is oftentimes frustrating for a user to switch among radio stations in an effort to find a music selection preferred by the user. Many times, when a user finally does find a music selection or song that the user prefers, the song may be ending and the user may have to initiate the station scanning process all over again. This is not only frustrating to the user but also distracting and even dangerous when the user is operating a motor vehicle at the same time.

Further, much of the music and other transmitted radio content is protected by Copyright laws and require the payment of fees to the Copyright owner for certain rights related to the use of the Copyrighted material. Heretofore there has been no widespread method for making such payments on an individualized basis for the personal use of Copyrighted radio and/or video content.

Thus, there is a need for an improved digital processing system which provides a greater degree of control by users of radio and other broadcast signal content which includes means for processing payments for the use of such signal content.

SUMMARY OF THE INVENTION

A method and system are provided in which a user is enabled to record, for example, a song or other radio and/or video content, on demand, and to account for and process appropriate payment for the use of the recorded content. The recorded material is saved and indexed by title and is retrievable for subsequent review, tabulation and/or playing at the user's convenience. The received content is accounted for and a payment for the use of the recorded song is processed in accordance with a predetermined payment schedule.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
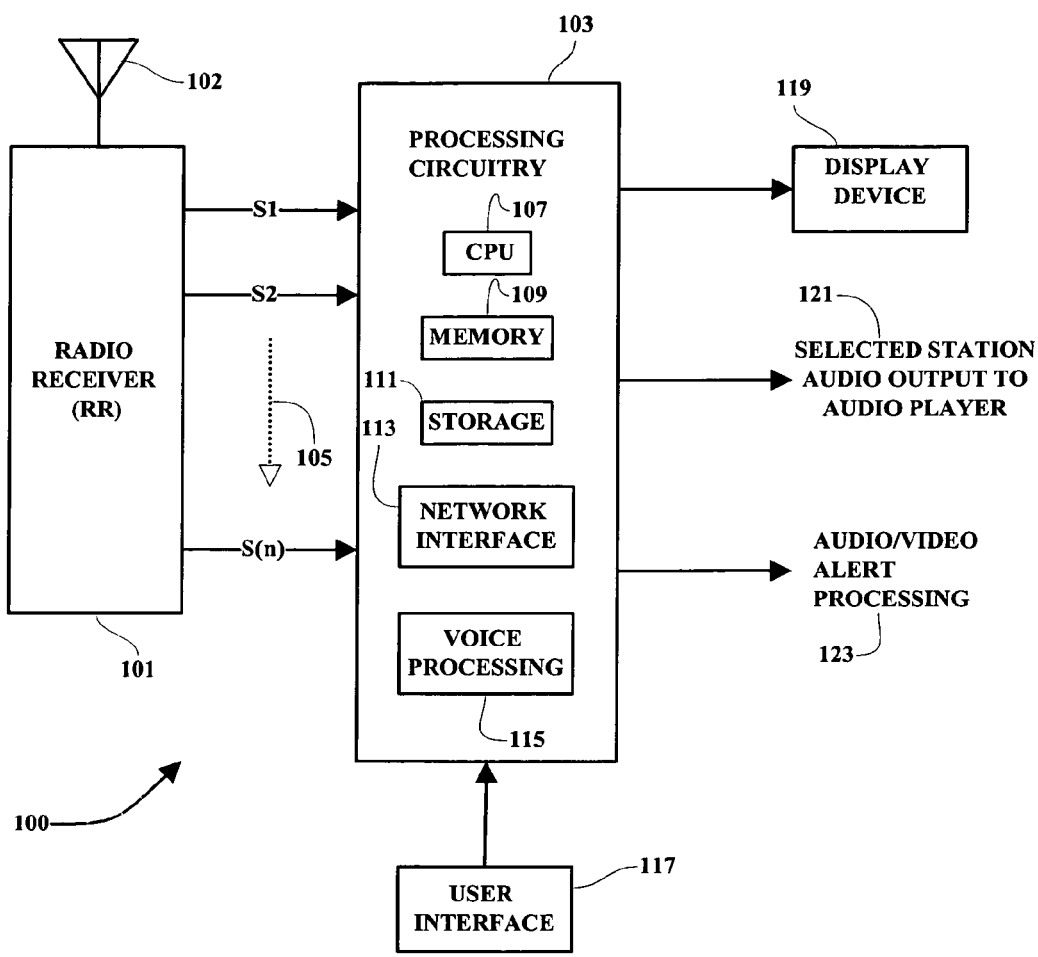
FIG. 1 is a block diagram of a receiving device implemented in accordance with the present invention.

Relatively recent developments in Radio Data System (RDS) and Radio Broadcast Data System (RBDS) technologies have resulted in widespread implementation of improved digital processing systems for radio transmission systems. With RDS, identification information concerning a song currently being played on a radio for example, is available from the broadcast information for other uses. For example, the name or title of the song, the artist, the album and other related information may be decoded from a received radio transmission and made available for additional processing. Although the present disclosure is made with regard to an RDS radio system, it is understood that the principles contained herein also have application to video signal processing methodologies, and may be used in connection with digital video receivers and recorders as well, in processing various types and titles of digital video signal streams. It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

With reference to FIG. 1, the various methods discussed herein may be implemented within a receiving device 100 which illustrates only one of many possible exemplary embodiments of the present invention. The receiving device 100 includes a receiver unit 101 which is arranged to receive broadcast or other transmitted signals through an antenna 102. Broadcast or other transmitted signals may also be received or transmitted through a hard-wire cable or directly from a satellite. The radio receiver unit 101 receives signals from the antenna 102 and converts those signals into a plurality of digital data streams 105 of information S1-S(n). Received signals may include, for example, amplitude modulated (AM), frequency modulated (FM) and/or citizen's band (CB) signals, inter alia. Analog signals are converted into digital streams through analog-to-digital converters (not shown) within the radio receiver unit 101. As hereinafter discussed in greater detail, a digital data stream is generated for each station that has been tuned-in or selected by a user of the receiver unit 101. If no stations have been pre-selected by a user, the receiver 101 provides data streams for each of a predetermined number of the strongest stations received by the receiver 101. In the present example, where no stations have been pre-selected by a user, the radio receiver 101 will digitize and provide data streams for the five strongest stations being received. It is understood that the exact number of default stations may be any number depending upon the application and the number of stations being received in the geographical area.

The station digitized data streams are applied to processing circuitry 103 which includes one or more CPUs 107, a memory unit 109, storage 111, a network interface 113 and voice processing circuitry 115. The memory unit 109 is used for selectively storing favorite songs and listings. The voice processing circuitry 115 enables synthesized voiced announcements to be made and also enables direct user input through voiced commands. Voiced inputs as well as push-button inputs and software menu-enabled user inputs are processed through a user input or interface unit 117. All of the functional blocks within the processing circuitry 103 are connected together by a common system bus. The system is designed to enable a user, inter alia, to input the name or title of a favorite song using a voiced input to the voice processing module 115. The voiced-in title will then be inserted into a favorites listing such that the system will subsequently search for the input title from song header information transmitted from the tuned radio stations. The user may also input song titles, or key words of a song title, for the system to use in searching incoming data streams to determine when a favorite song or title is being played on one of the radio stations.

Outputs from the processing circuitry 103 are provided to a display module 119, and also as played station audio output to a speaker system 121 of an audio player. The display device 119 may comprise, for example, a liquid crystal display (LCD) which is viewable by a user in a motor vehicle. Outputs from the processing circuitry are also provided to an audio alert system 123, which, in response to signals provided from the processing circuitry 103, is enabled to alert a user to various conditions by sounding alarms and/or synthesized voice announcements. Other alarms including visual alarms (i.e. flashing or blinking text) are also enabled to effect and modify visual presentations or screens on the display module 119.

Figure 2:
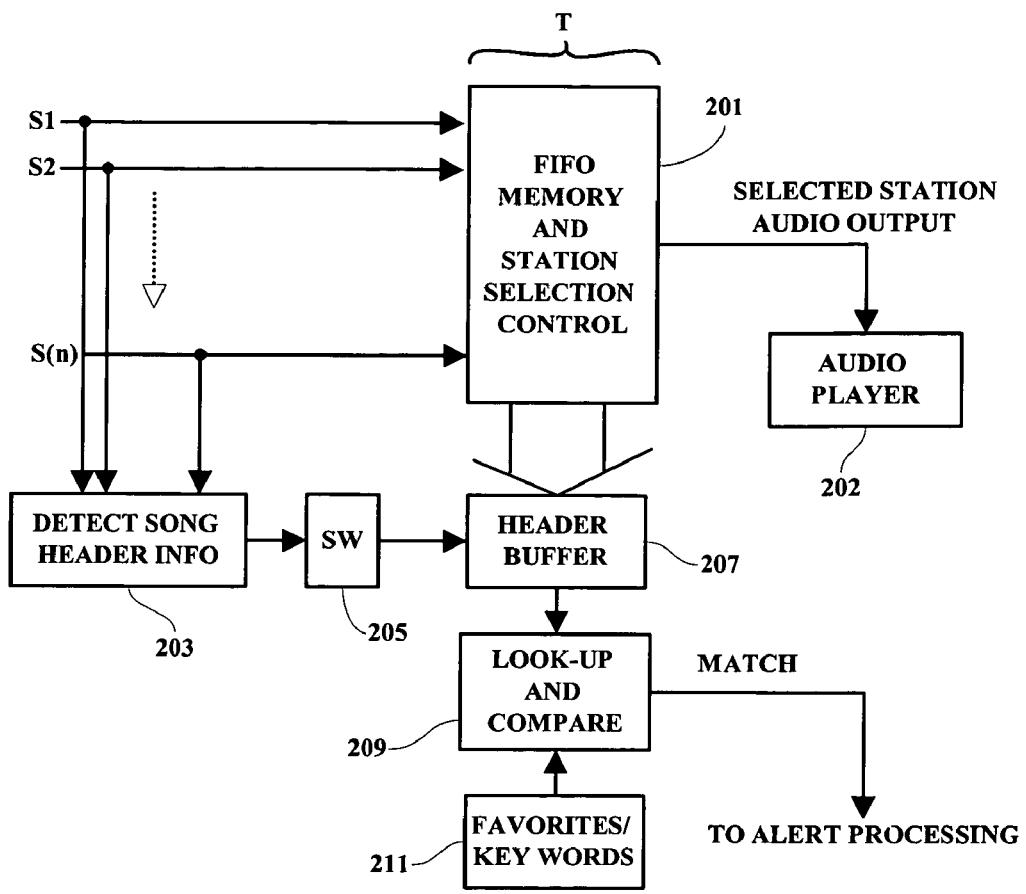
FIG. 2 is a schematic block diagram of a compare function implemented in accordance with the present invention.

As shown in FIG. 2, in one example, audio data streams S1-S(n) are applied to a First-In First-Out (FIFO) memory and station selection control unit 201. The FIFO memory is designed to capture and shift data streams of a length, i.e. "T", which corresponds to the length of a typical audio stream for most popular songs. When a song is queued for playing by a tuned station, header information containing the song title and other related information is detected 203 and the header information is switched by a switching device 205 to a header information buffer 207 where it is accessed and compared in a look-up and compare circuit 209 to a favorites list containing a listing of a user's favorite songs and key words. When a match is detected between the favorites list of key words or titles and the song that is currently being played on-one of the monitored stations, the song and the full song title are saved and a message may be displayed stating that the detected song is currently being recorded from the indicated station. Alert signals may also be sent to alert a user that one of the user's favorite songs is currently being played on a given station. Subsequently, when a user switches from another station in order to hear a favorite song, the beginning of the song is referenced to begin playing from the appropriate FIFO memory unit. Each of the predetermined tuned radio stations provides a digital data stream and each data stream is applied to a different channel in a FIFO memory and selection control unit 201. As shown, a user may select which station is to be played and the data stream from the selected station is output to an audio player 202.

Figure 3:
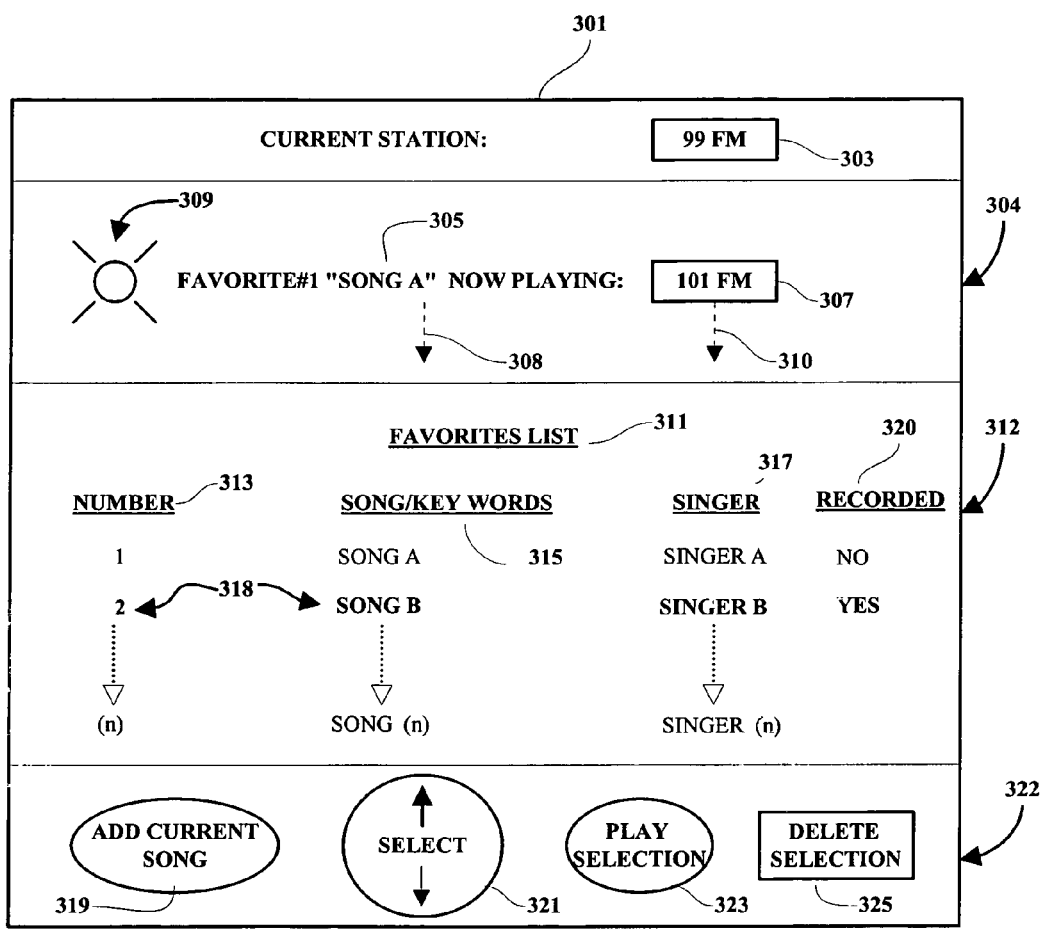
FIG. 3 is an illustration of one embodiment of a display unit used in connection with the present invention.

In FIG. 3, there is shown a display screen arrangement 301 which is positioned to be viewable by a user (i.e. driver or passenger) within a motor vehicle for example. As shown, the display screen arrangement 301 includes a display area 303 to display the station to which the radio receiver is tuned at any given time. Another section 304 of the display area includes a "favorite song" area 305 which indicates when one or more of a user's favorite songs are playing on one of the tuned stations 307. When more than one of the user's favorite songs are playing at the same time, all songs that are currently playing will be indicated 308 along with the respective stations 310. Songs that have been previously recorded or saved to memory may also be selected and played by a user and the display area 304 will identify which song is currently being played.

In another display area section 312, there is shown a Favorites List 311 which displays an assigned reference number 313 for each favorite song of the user together with the corresponding song title 315 and singer 317. There is also a column to indicate whether or not a particular song on the favorites list has already been recorded 320. Those songs that have been recorded may be selected, highlighted and played from memory by the user by hitting a Play button 323. Songs on the favorites list which have been identified and input to the favorites list by the user (for example by a menu-driven user input or voiced input) cannot be played from memory until the receiver has recorded the playing of that song from a tuned station. However, a user may have an unrecorded favorite played by actuating the Add button 319 when a song which the user wished to record is currently being played on the radio station as is hereinafter explained in connection with FIG. 6.

In another section 322, a user is enabled to select songs from the Favorites List 311, e.g. Song B, for playing and/or deletion. A user is enabled to move from song to song on the Favorites List 311 by manipulating the Select Button 321 which will highlight 318 the particular song selection on the display screen. The user is then enabled to either play a selected recorded song by actuating the Play Button 323 or delete the selected recorded song by actuating a Delete Button 325. The various buttons are shown in differing shapes in order to facilitate the selection of the correct button by a user driving a motor vehicle without requiring the user to look at the button itself. In another exemplary implementation, the various buttons are positioned on the side of the steering wheel for easy access.

The "Add Current Song" feature enables a user, for example a driver of a motor vehicle, to hit only one button, i.e. the "Add Current Song" (ADD) Button 319, in order to have a song currently being received by the receiver 101 on any of the tuned stations, to be marked and entered on the "Favorites List" 311 and optionally recorded from the FIFO memory 201 to non-volatile (NV) memory and/or storage for later retrieval and playing at the user's convenience. When a user hears a song on the station currently being listened to and the user wishes to record the current song, all the user has to do is hit the ADD button 319. If a favorite song is being played on another station, then an alert signal, i.e. blinking or steady light 309 will be activated to show that a favorite 305 is playing and on which station 307. An audio alert signal may also be concurrently sounded in order to get the user's attention. The user may then manually switch to the indicated station at which time the alert signals will be turned off. Light 309 and/or indicator 307 may also serve a dual function as a push button switch in order to facilitate switching stations and insure that the correct station is switched to without requiring the user to manually search for the correct station as displayed 307. The unit may also be programmed to automatically switch stations when a favorite is playing on another station. The processing may also include a check on the currently playing song before switching so that the player will not switch to a new station if a favorite is already playing on the current station. The "ADD", "DELETE" and other functions may also be implemented through the use of an embedded voice processing system in which case the user need only speak an appropriate command such as, but not limited to, "Add", or "Delete" or "Change Station".

Figure 4:
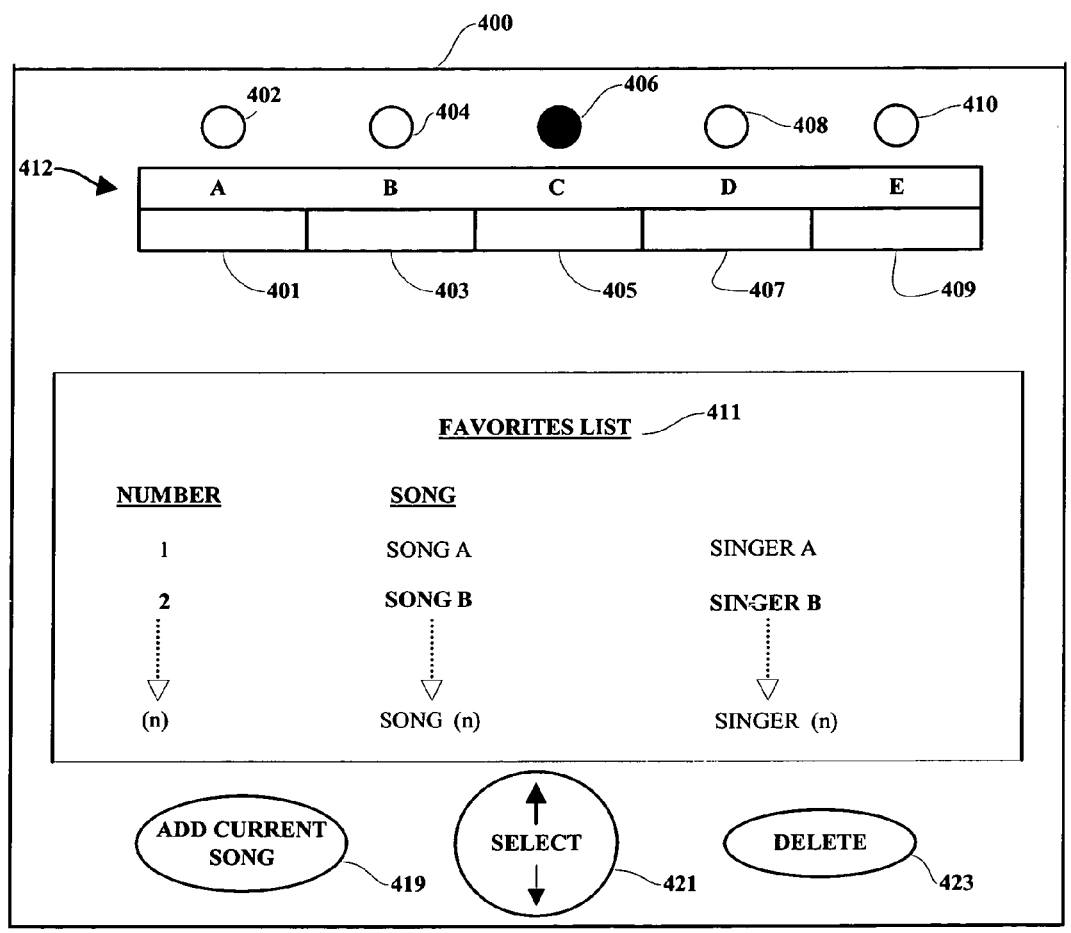
FIG. 4 is an illustration of another embodiment of a display unit which may be used in connection with the present invention.

FIG. 4 shows a simplified alternate layout of a display arrangement 400 in which typical radio selection push buttons 401, 403, 405, 407 and 409 are arranged to correspond to tuned radio stations A, B, C, D and E which are shown on display area 412. In FIG. 4, each radio station has a corresponding alert light indicator 402, 404, 406, 408 and 410 which is designed to light up when a favorite song is playing on the corresponding station. The function of the alert light indicators 402-410 are the same as alert indicator 309 in FIG. 3. FIG. 4 also shows a simplified operational panel section for adding 419, selecting 421 and deleting 423 songs from a displayed favorites playlist 411.

Figure 5:
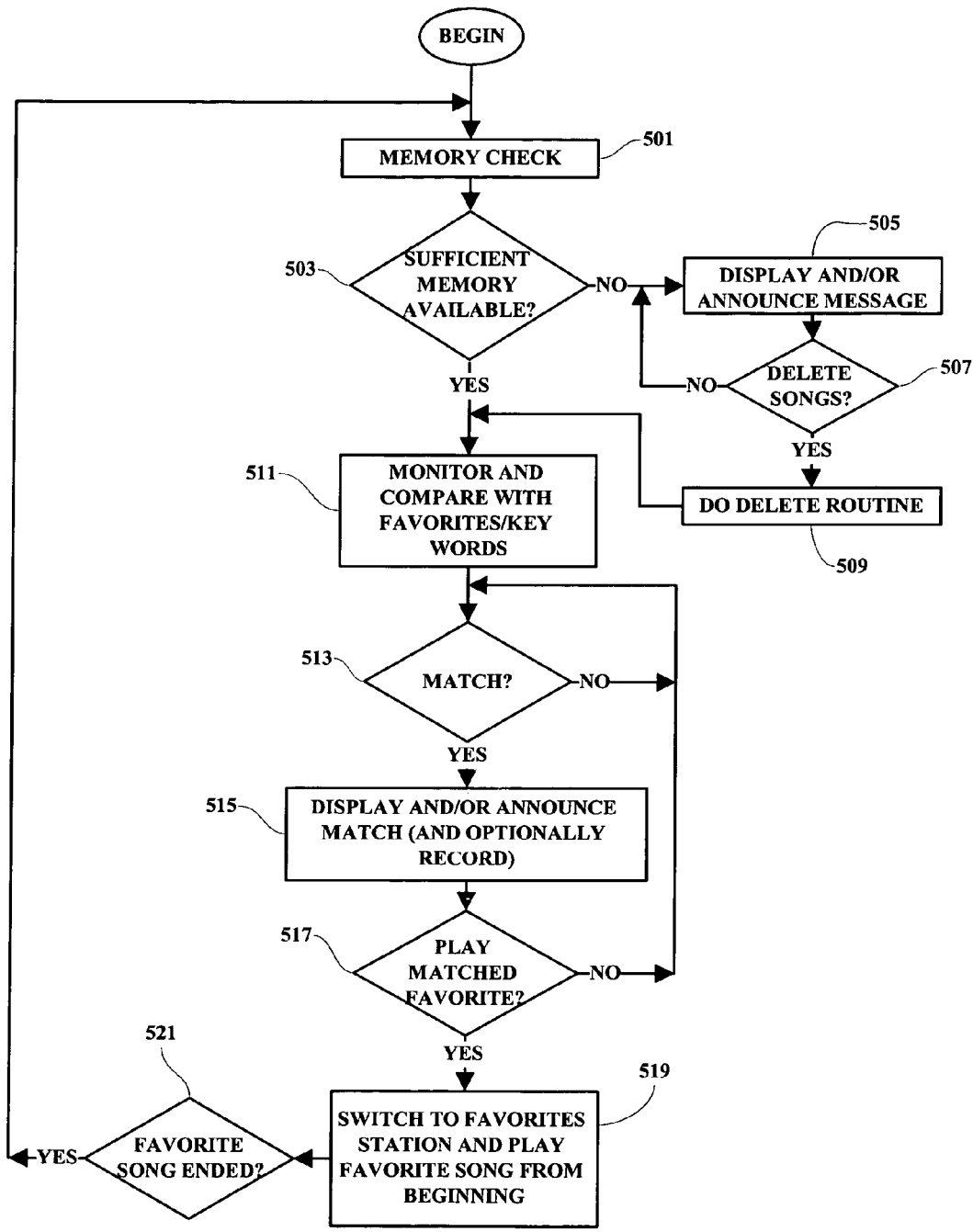
FIG. 5 is a flowchart showing an exemplary operational sequence in one implementation of the present invention.

As shown in the flow chart of FIG. 5, in a typical operation when the system is initiated, a memory check 501 is first made in order to insure that there is sufficient memory available to store a favorite song if one is played while a user is listening to the radio input audio player. This memory check precludes the possibility that a user will be alerted that a favorite song is being played but there is not sufficient memory to record it. Next, if sufficient memory is available 503, then the data streams from the tuned stations are monitored and compared 511 with the favorites list to look for a "match". If there is not sufficient memory 503 to store a favorite song if a favorite song happens to be detected, then an appropriate message is displayed and/or announced via synthesized voice message 505, and an option 507 is given to the user to execute a delete function 509 to delete a selected favorite and make memory space available for a new favorite song before beginning to monitor the tuned stations 511. In the illustrated example, the monitoring of tuned stations does not occur if there is not sufficient memory available to save.

Next, when a match occurs 513 between a song or key words on the favorites list and a song playing on one of the tuned radio stations, the currently playing status is announced 515 to a user by an alert signal. If the user chooses to have the favorite song played 517 on the audio player, then the radio channel is switched 519 to the station which is playing the favorite song and the favorite song is played. When the favorite song has completed playing 521, the processing continues from the memory check block 501.

In another example, the user is enabled to actuate a "record only" button (not shown) so that when the playing of a favorite song is detected on another station, the system records the favorite song from the other station "in the background" but does not change the station that is currently being listened to by the user. Further enhancements include the ability to set degrees of preferences for favorite songs such that one song or a group of preferred songs will be displayed in one color and/or more prominently, while other less preferred songs would be displayed less prominently and/or in a different color. In this example, when preferred songs are played on another station, the system automatically switches stations but when less preferred songs are detected as being played, only a visual and/or audio indication or alert is given and the user has the option to manually switch to the new station at that time.

Figure 6:
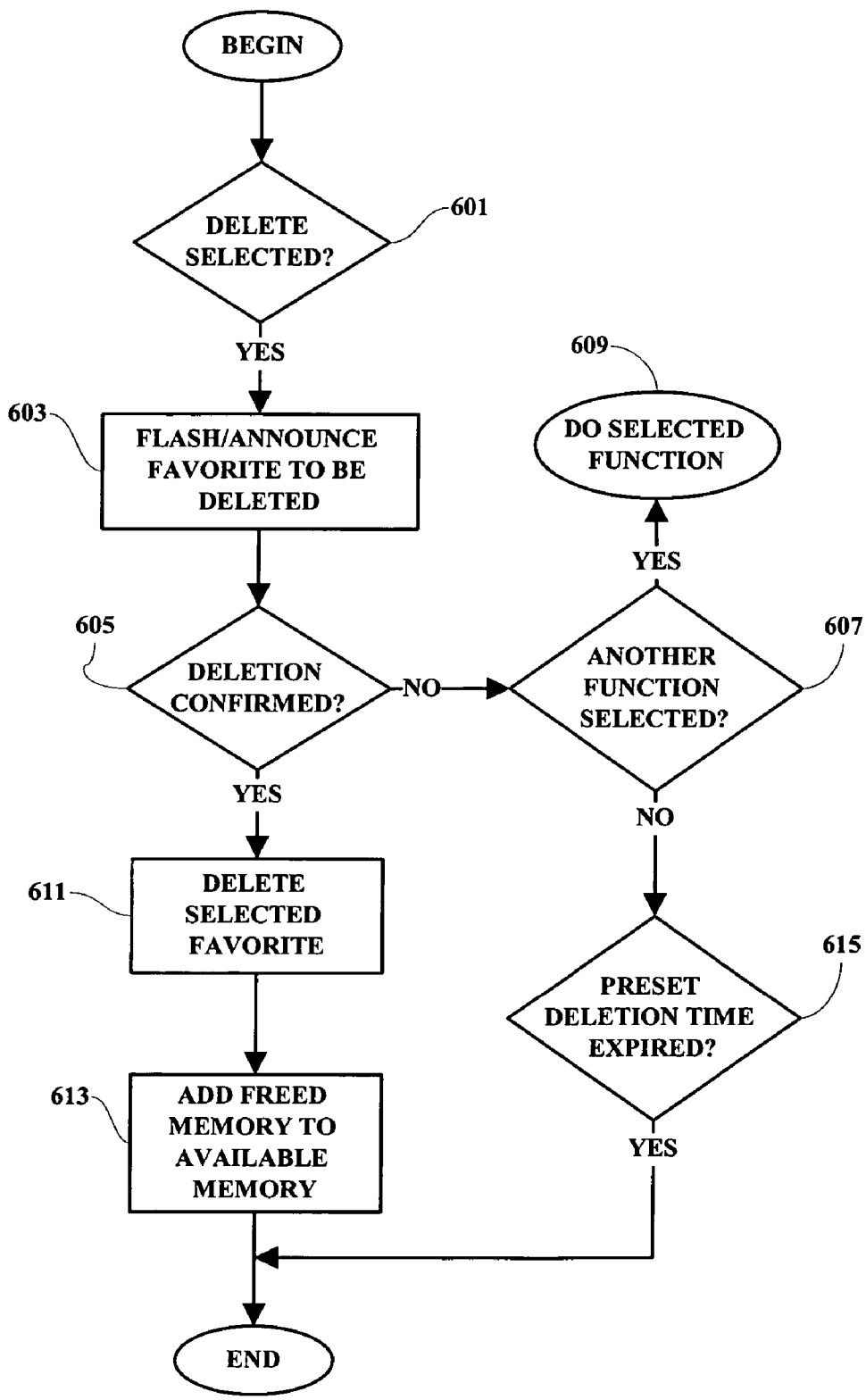
FIG. 6 is a flow chart illustrating an exemplary operational sequence for an "DELETE" function as may be used with the present invention.

FIG. 6 illustrates an exemplary operational sequence which occurs during a Delete function. As shown, when a delete function is selected 601 by a user pushing the delete button 325, the selected favorite song on the play list is highlighted, for example, by blinking text 603 to identify the song to be deleted. If the highlighted song is the one intended to be deleted by the user, the user will confirm 605 the delete function by, for example, hitting the delete button 325 a second time. If the wrong song is highlighted for deletion, the user may select another function 607. For example, the user may hit the select button 321 to move up or down on the favorites list and that operation 609 will cancel the pending but unconfirmed deletion operation. The user may also choose the Add 319 or Play 323 buttons to effect a cancellation of the pending but unconfirmed delete function. If after hitting the Delete button one time, no further action is taken for a predetermined period of time 615, the Delete function will also be canceled and the process will end. If the Delete function is confirmed by the user by hitting the Delete button, for example, for a second time, then the highlighted song will be deleted 611 and the memory that was taken by the deleted song will again be made available 613.

The processing herein disclosed may be implemented in many forms and combinations of hardware and software. The following illustrates an exemplary high level source code listing which may be used, for example, to alert a driver when a favorite song is playing.

```
blnFavoriteSongPlaying=false
while (true) {
    1. Get RDS info for currently playing radio station.
    2. Look up song title in favorite songs list. If
present, blnFavoriteSongPlaying=true,
        else blnFavoriteSongPlaying=false.
    3. For each preset station in preset stations list
        3a. Get RDS info for currently playing song. (The
car would have a separate tuner for this purpose so as not
to interfere with the currently playing song).
        3b. Look up song title in favorite songs list.
        3c. If title exists in favorite songs list
            3c1. If (blnFavoriteSongPlaying)
                3c1a. Update timestamp for entry in
favorite songs list with current time.
            3c2. Else
                3c2a. Retrieve timestamp for entry in
favorite songs list.
                3c2b. If (timestamp!=null&&(current
time-timestamp)>30 seconds)
                    3c2b1. Clear timestamp for entry
in favorite songs list.
                    3c2b2. Turn off display for
flashing light above preset station, if it was currently on.
                3c2c. Else
                    3c2c1. Display flashing light
above preset station that has been currently cycled to in
order to alert the driver that a favorite song is playing on
a different station.
}
```

In an exemplary video application, a user in a home environment is enabled to indicate by using a digital video recorder and menu driven inputs, a specific type of broadcast such as "Sports" or "Basketball", and a processing methodology as described above would alert the user when a preferred type of video broadcast is being played on a channel other than the channel currently being watched by the user.

Similar processing methodologies including the recording function, are applied to enable the user to add, switch to or record a channel where a preferred type of video presentation is being presented.

Figure 7:
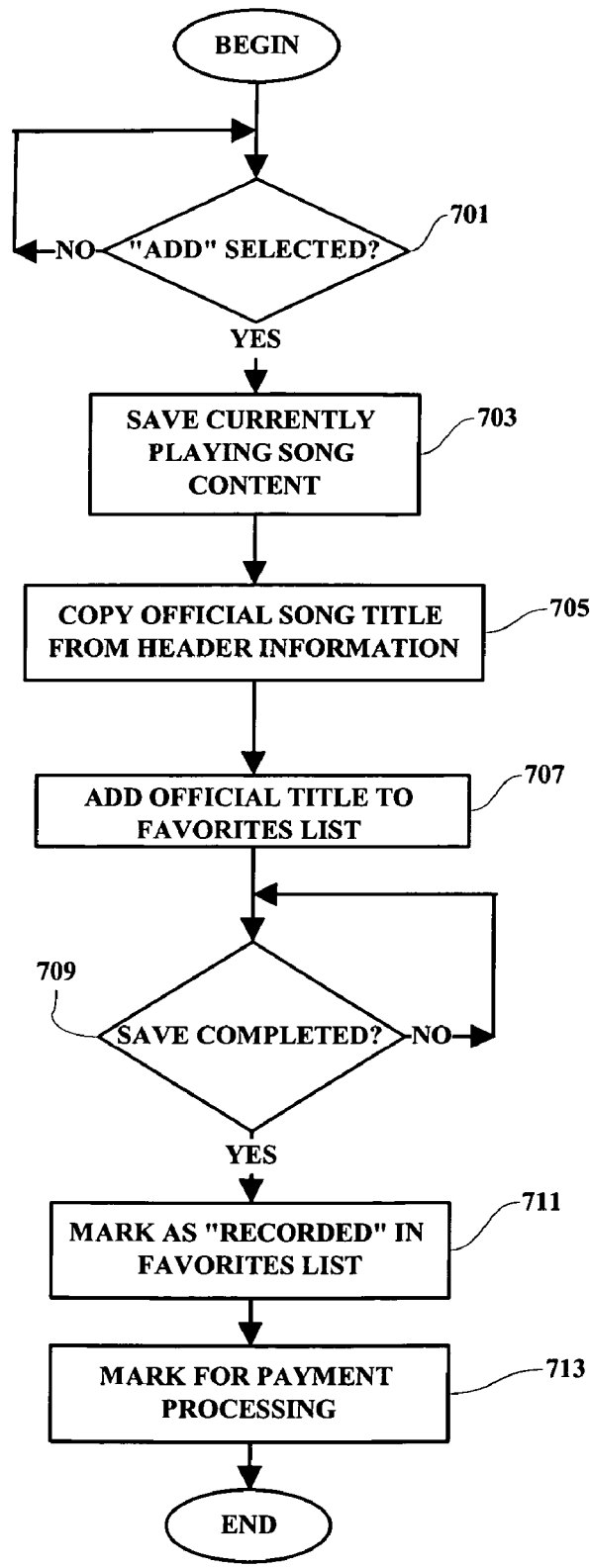
FIG. 7 is a flow chart illustrating an exemplary operational sequence for an "ADD" function as may be used with the present invention.
Figure 8:
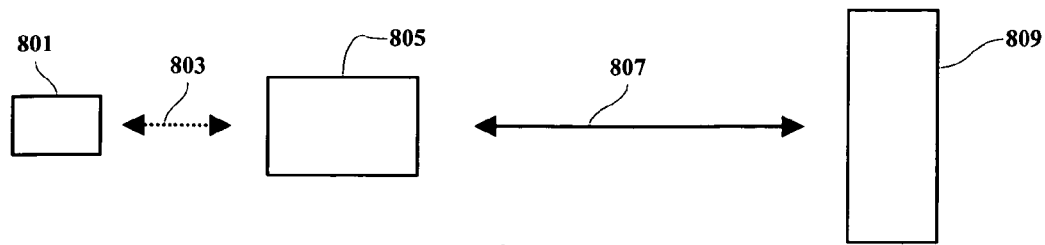
FIG. 8 is an illustration showing operational relationships among the components of one embodiment of the present invention.

FIG. 7 illustrates an exemplary operational sequence which occurs during an ADD function. As shown, when an ADD function is selected 701 by a user pushing the add button 419 (FIG. 4), the song content for the currently playing song is saved 703 and the official song title is copied 705 from the RDS song header information. If the RDS system does not continue to show the title during the entire song or content segment, the system is configured to record for a prescribed amount of time (e.g. six minutes) sufficient to include almost all songs of interest or is configured to use the button press to save the content or another button to indicate the endpoint of the song or other content. The official song title is then saved in the Favorites List 707 and when the song content has been saved 709, the Favorites List is updated to show that the newly saved song has been "Recorded" 711 as shown in column 320 of FIG. 3. After being recorded 711, the recording is "marked" for payment processing 713 either as a batch process or on a real time "as recorded" basis. The payment processing may also be initiated at any time during the recording process.

A payment for the recorded song or content is made in one of several ways. In one example, a value card is inserted into the radio or suitable reader device. The value card is a form of a so called "smart card" which may include input and output means along with a memory unit and processing circuitry. In this example, the value card is a pre-purchased card, similar to a phone card, which give the holder the ability to purchase a specified number of items of content or a specified amount of time of content. The amount of the remaining balance held by the card is reduced by the amount of the content that has been recorded and stored.

In another example, the value card 801 saves the titles of the recorded content in the memory unit of the value card. Subsequently, when the card approaches or reaches zero remaining value, the card can be taken to a store or other vendor and inserted or otherwise interfaced 803 to a processing/reader device 805. The titles can then be transmitted 807 to a central server 809 where the recorded titles are used to look-up a payment amount due for the recordings made and the payment process to the Copyright owner can be initiated. At this time, the stored content titles are read out of the card so that the actual content providers can be compensated on an actual usage basis rather than on a general pool basis as is currently widely done. Purchase credits can also be "refilled" by clearing the value card memory and providing payment "credits" in the value card memory. As an incentive to bring the card back for refilling and retrieving the titles, the user may be given extra free usage credits.

In another example, the processing function is accomplished using wireless capabilities (or wired in the case of fixed devices or readers) through an interconnection network to a Copyright clearinghouse server. In the example, the server looks-up a chargeable amount for the recorded songs and charges an appropriate amount, in accordance with a predetermined charge schedule, to the user's account or credit card. Currently available wireless communications systems, such as the "ONSTAR™ system", are also available for use in a wireless implementation of the disclosed processing system. The payment processing and "re-filling" function may also be performed at gasoline stations or convenience stores for example, using short range "Bluetooth™" links or similar technology.

Figure 9:
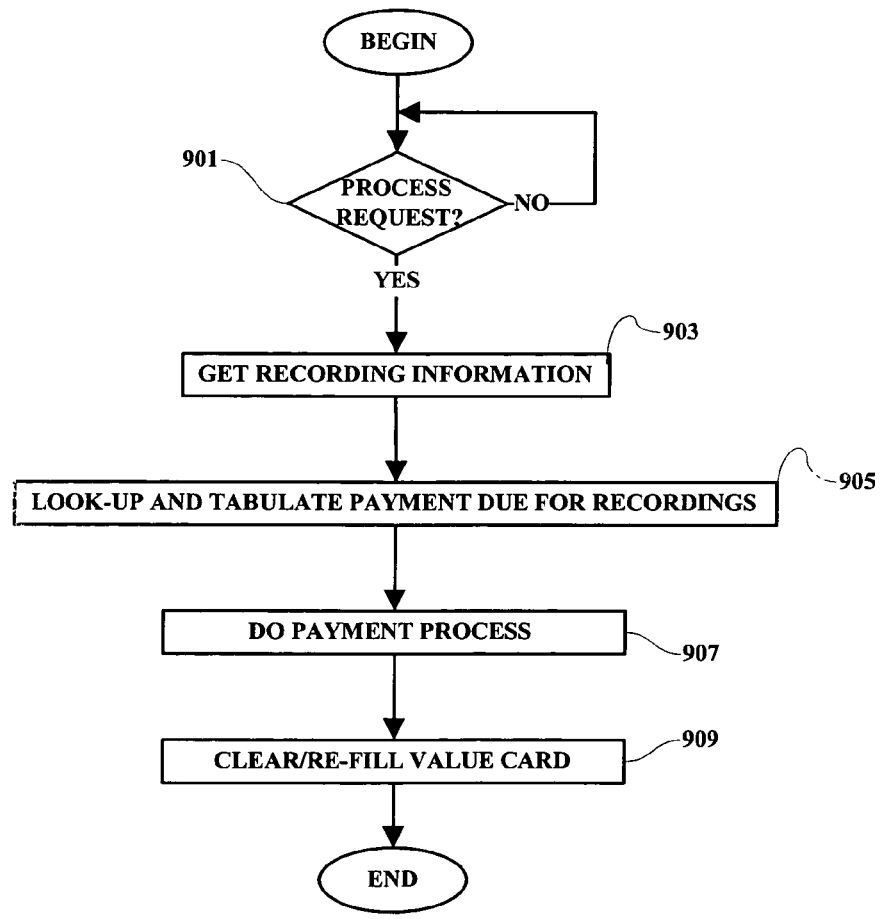
FIG. 9 is a flow chart illustrating a high level flow sequence in one embodiment of the present invention.

A high level flow chart of the payment processing methodology is illustrated in FIG. 9. As shown, The payment processing begins when a request 901 is made by a user. This may be accomplished by inserting the value card into a reader or other processing device which may be located as part of the local radio receiver system or at selected processing facilities installed in gasoline or other convenience store locations. When the value card is presented for processing 901, the information, including the titles of the songs that have been recorded, is read 903 from the value card, and the process looks-up 905 corresponding payments amounts for the recorded songs. This may be accomplished through a look-up function to a payment table or database which indicates payment amounts due for individual songs by song title. The payment table may also include the identity of the Copyright owner to whom payment will be made. Song titles may be assigned unique identification numbers to facilitate the processing. The payments due are then tabulated 905 and the payment process is initiated 907. The payment process may, for example, maintain running accounts for the user and periodically process payments for the user's recorded songs to a Copyright clearinghouse server for payment to the appropriate Copyright owners. This may include the automatic accounting for individual songs recorded by a user along with corresponding payment amounts and the sending of emails and/or account entries to initiate a payment process. The value card memory is then cleared and, if requested by the user, may be re-filled 909 with purchase credits for a predetermined amount of media signal content in card memory.

In another example, a value card is not used but rather the payment for recorded media content is made through normal credit card processing and the payment may be made to whomever is designated by the party controlling the sending of the media content. Further, the user may be logged into a music distribution site through the Internet, for example, and selected musical media content can be wirelessly or otherwise downloaded to the user for recording after a selection of one or more songs has been made and the appropriate payment amount has been determined and processed.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored on a CD, disk or diskette (portable or fixed), or other memory device, from which it may be loaded into memory and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing compensation to a first party for use of a broadcast unencrypted audio file being broadcast from a radio station, said unencrypted audio file being effective to cause a playing of said unencrypted audio file on an audio playing device of said user, said method comprising:

receiving said broadcast unencrypted audio file by said user;

providing an identifying indicium for said broadcast unencrypted audio file;

providing a selection device, said selection device being operable by said user to select one of said broadcast unencrypted audio files as said one of said audio files is being played on said audio playing device;

saving said selected one of said broadcast unencrypted audio files in its entirety only upon detection of an actuation of said selection device by said user;

using said identifying indicium to determine a payment amount corresponding to a use of said broadcast unencrypted audio file; and processing said payment amount to effect payment of said payment amount wherein said identifying indicium is a title of said broadcast unencrypted audio file, said method further including storing said identifying indicium in a wireless memory device and reading said identifying indicium from said wireless memory device prior to said using, wherein said using comprises comparing said identifying indicium to a database of similar indicia to determine a payment amount corresponding to said identifying indicium, wherein wireless memory device includes pre-payment means by which said wireless memory device is programmable to operate in combination with a user recording device to selectively enable a user recording device to record a predetermined quantity of said broadcast unencrypted audio files, wherein said wireless memory device is selectively operable in combination with a reading device to determine said payment amount corresponding to said identifying indicium read from said memory device, and wherein said identifying indicium for said broadcast unencrypted audio files recorded by said user is wirelessly transmitted from a user playing device to a processing center, said processing center being operable for determining said payment amount corresponding to said identifying indicium.

* * * * *